United States Patent [19]

Simm et al.

[11] Patent Number: 4,489,620
[45] Date of Patent: Dec. 25, 1984

[54] DRIVE UNIT FOR A CLEANING DEVICE

[75] Inventors: Hans-Peter Simm, Wuppertal; Wieland Gühne, Remscheid, both of Fed. Rep. of Germany

[73] Assignee: Vorwerk & Co. Interholding GmbH, Wuppertal, Fed. Rep. of Germany

[21] Appl. No.: 321,895

[22] Filed: Nov. 16, 1981

[30] Foreign Application Priority Data

Dec. 5, 1980 [DE] Fed. Rep. of Germany ....... 3045895

[51] Int. Cl.³ ............................................. F16H 21/18
[52] U.S. Cl. ............................................. 74/42; 74/54
[58] Field of Search ............... 74/42, 54, 47; 15/22 R, 15/22 C

[56] References Cited

U.S. PATENT DOCUMENTS

| 232,232 | 9/1880 | Beidler | 74/54 |
|---|---|---|---|
| 1,307,146 | 6/1919 | Petterson | 74/42 |
| 1,723,335 | 8/1929 | Dyess | 74/42 |
| 2,875,458 | 3/1959 | Tsuda | 74/42 |
| 3,160,902 | 12/1964 | Aymar | 74/47 |
| 3,168,834 | 2/1965 | Smithson | 74/47 |
| 3,233,265 | 2/1966 | Hartmann | 74/47 |
| 3,365,963 | 1/1968 | Happe | 74/47 |
| 3,394,277 | 7/1968 | Satkunas | 15/22 R |
| 4,326,314 | 4/1982 | Moret | 15/22 R |

FOREIGN PATENT DOCUMENTS

| 807737 | 7/1951 | Fed. Rep. of Germany | 74/47 |
|---|---|---|---|
| 53-33751 | 3/1978 | Japan | 15/22 R |

Primary Examiner—Lawrence J. Staab
Attorney, Agent, or Firm—Michael J. Striker

[57] ABSTRACT

A drive unit for a cleaning device includes a pivotable drive member which is rigidly secured to a shaft imparting a working motion to a working tool brush of the cleaning device and worm gear unit operatively interconnected between a drive shaft of the drive used for the cleaning device and the pivotable drive member and provided with an eccentric rotatable with the worm gear of the worm unit and a guide engageable with a pin secured to the drive member for translating the rotational movement of the drive shaft to the shaft of the tool brush.

6 Claims, 3 Drawing Figures

DRIVE UNIT FOR A CLEANING DEVICE

BACKGROUND OF THE INVENTION

The present invention relates to drive units utilized for driving working tools of cleaning devices, such as electrical brushes or the like. More particularly, the invention relates to a drive unit for translating a rotational movement of a drive shaft of a drive into a periodical pivoting movement of a shaft connected to the working tool of the cleaning device.

It has been known to utilize in cleaning devices transmission units for translating a rotational movement of the electromotor drive into an oscillating pivoting movement of the cleaning working tool. Such known units usually comprise a crank assembly in which the electromotor shaft is provided with an eccentric which reciprocally moves a lever arm so that the pivoting movement is performed. Assemblies with such drive units however, are of relatively large dimensions, these dimensions are further increased if any additional transmission elements are inserted into the unit.

SUMMARY OF THE INVENTION

It is an object of the invention to provide an improved drive unit for a cleaning device.

Another object of the invention is to provide a drive unit which may be readily installed into the cleaning device without substantial enlarging its dimensions.

These and other objects are attained by a drive unit for a cleaning device having a rotary shaft and a working tool, operative for translating a rotational movement of the rotary shaft into oscillating pivoting movement of the working tool, the drive unit comprising a shaft connectable to the working tool; an end member mounted on the rotary shaft of the drive; a drive element rigidly connected to said connectable shaft and arranged to coaxially surround said end member; and translation means connected to the end member and operative for translating the rotational movement of the rotary shaft to the oscillating pivoting movement of the drive element.

The translation means may include a worm gear unit which may have a worm connected to said end member and having an axis and a worm gear with an axis positioned at 90° relative to the axis of said worm.

The translation means may further include at least one eccentric and a weight compensation element rigidly connected to said worm gear.

The worm gear, the eccentric and the weight compensation element may be mounted on a common axle and connected to each other by a sleeve into a unit which is adapted to rotate on said common axle upon rotation of the worm gear.

The translation means may further include a lengthwise guide mounted on the eccentric and a pin arranged in the drive element and engageable with said guide.

The pin may carry a slidable roller surrounding the pin and supported in said lengthwise guide.

In accordance with another embodiment of the invention two eccentrics may be provided which are oppositely positioned at each side of the worm gear.

The drive element may be formed with two oppositely positioned shells and said eccentrics may be provided with respective pressure members abutting against said eccentrics and pivotally supported in said shells so that the rotational movement of said eccentrics is translated into the oscillating pivoting movement of said drive element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
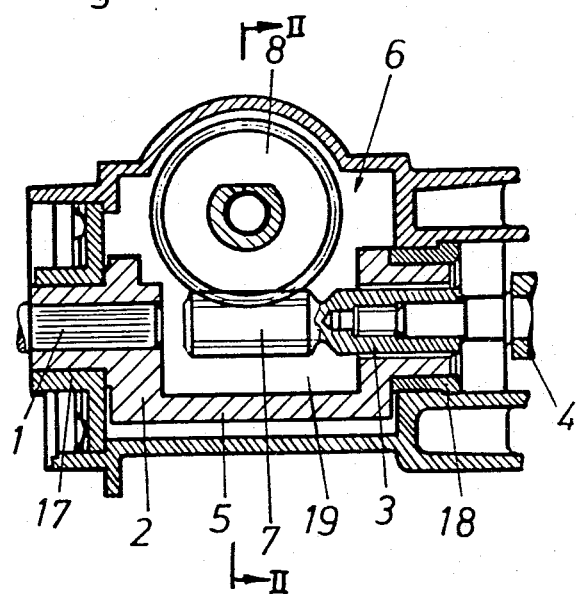
FIG. 1 is a sectional view of a drive unit for a cleaning device, in accordance with the invention.
Figure 2:
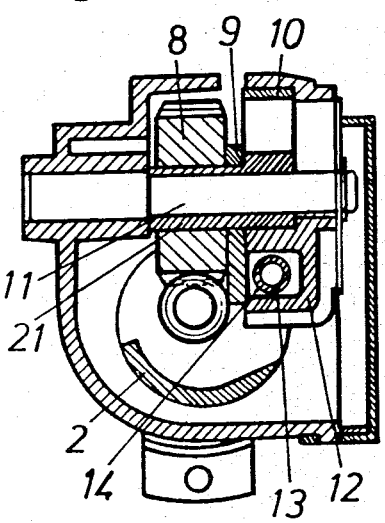
FIG. 2 is a sectional view taken on line II—II of FIG. 1.

Referring to FIG. 1 a gear unit in accordance with the invention includes a shaft 1 which is to be connected with a working tool brush of a cleaning device normally operated in conjunction with a vacuum cleaner and not shown in the drawing. The shaft 1 is rigidly supported in a drive element 2. The drive element 2 is in turn pivotally supported in bearings 17, 18 and, in its intermediate portion is formed with a recess 19. A rotary driving shaft 4, which may be connected to an output of an electric motor (not shown in the drawing) or to any other conventional drive, is rotatably supported in a bearing 20 and by means of an end element 3 is coaxially surrounded by the drive element 2. As seen in FIGS. 1 and 2 the end element 3 freely extends through an opening formed in the drive element 2.

The end element 3 carries a worm 7 which together with a worm gear 8 forms a worm gear unit.

With reference to FIG. 2 it is seen that the worm gear 8 is rigidly connected to an eccentric 10 and a weight compensation element 9. All three members 8, 9 and 10 are connected into a one-piece unit by a bearing element 21 positioned on an axle 11. Pivotally attached to the eccentric 10 is a lengthwise guide 12. The rotation movement of the eccentric 10 transforms into oscillating pivoting movement of the guide 12. The guide 12 is provided with a recess surrounding a pin 13 which is positioned in the drive element 2. A slidable roller 14 which engages with the guide 12 is mounted on the pin 13. During rotation of the eccentric 10, whose rotation is caused by the rotary shaft 4, worm 4 and worm gear 8, and due to retaining the pin 13 in the recess of the lengthwise guide 12 the oscillating pivoting movement of the guide 12 is translated into an oscillating pivoting movement of drive element 2 which periodically pivots to the right or to the left as assumed in the plane of the drawing. Inasmuch as shaft 1, which actuates the working tool brush, is rigidly connected to the drive element 2 this oscillating pivoting movement will be translated to shaft 1 and therefore to the working brush of the cleaning device.

Figure 3:
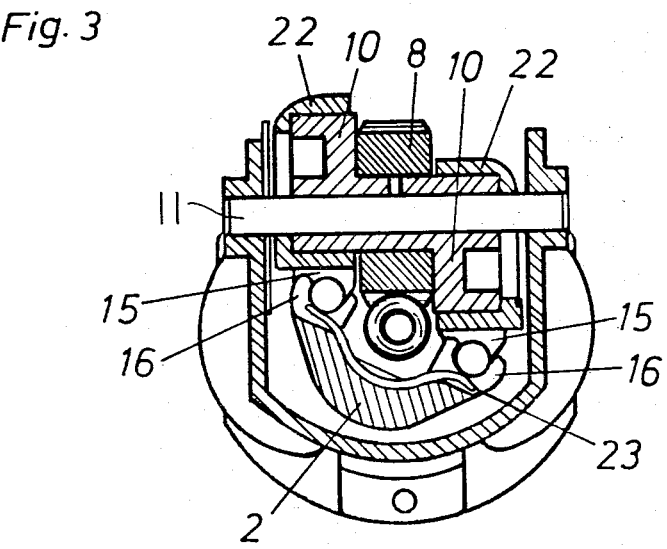
FIG. 3 is a sectional view through a plane similar to that of FIG. 2 but of another embodiment of the invention.

FIG. 3 shows a modification of the drive unit according to the invention. In this embodiment the unit is provided with two eccentrics 10 positioned at either side of the gear worm 8. A pivotally arranged transmission sleeve 22 is mounted on each eccentric 10. Each transmission sleeve 22 abuts against a respective pressure member 15. These pressure members having rounded surfaces are pivotally supported at these surfaces in respective shells 16 which are portions of the drive element 2. The pressure elements 15 are urged by a spring 23 to press against the transmission sleeves 22. Since both eccentrics 10 are oppositely positioned with respect to rotating worm gear 8, when the worm gear and thus the eccentrics rotate upon rotation of the drive shaft 4, this rotation is translated into periodical movement up and down of oppositely positioned pressure member 15 and therefore into oscillating pivoting movement of the drive shaft 1 which in turn imparts such a movement to the working tool of the cleaning device.

It will be understood that each of the elements described above, or two or more together, may also find a useful application in other types of drive units for cleaning devices differing from the types described above.

While the invention has been illustrated and described as embodied in a drive unit, it is not intended to be limited to the details shown, since various mofifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drive unit for a cleaning device having a drive with a rotary shaft and a working tool, operative for translating a rotational movement of the rotary shaft into oscillating pivoting movement of the working tool, the drive unit comprising a shaft connectable to the working tool; an end member mounted on the rotary shaft of the drive; a drive element rigidly connected to said connectable shaft and arranged to coaxially surround said end member; and translation means connected to said end member and operative for translating the rotational movement of the rotary shaft to the oscillating pivoting movement of said drive element, said translation means including a worm connected to said end member and having an axis, a worm gear having an axis positioned at 90° relative to the axis of said worm, at least one eccentric rigidly connected to said worm gear, an elongated axle, said worm gear and said eccentric being arranged on said axle so that said eccentric rotates on said axle upon rotation of said worm gear, at least one transmission guide mounted on said eccentric, and slidable roller means operatively interconnected between said transmission guide and said drive element to translate the rotational movement of said eccentric into oscillating pivoting movement of said drive element.

2. The drive unit as defined in claim 1, wherein said slidable roller means include a pin connected to said drive element and a slidable roller surrounding said pin, said transmission guide having a surface engageable with said slidable roller.

3. The drive unit as defined in claim 1, wherein two eccentrics are provided on said axle, oppositely positioned at each side of said worm gear, and two transmission guides are provided, each mounted on the associated eccentric, said slidable roller means including two pressure members abutting against the respective transmission guides and having rounded surfaces, said drive element being formed with shells receiving and pivotally supporting said pressure members at the rounded surfaces thereof.

4. The drive unit as defined in claim 2, wherein said translation means further include a weight compensation element arranged on said axle and rigidly connected to said eccentric.

5. The drive unit as defined in claim 4, said translation means further include a sleeve surrounding said axle and connecting said worm gear, said weight compensation element and said eccentric into a rotatable unit adapted to rotate on said axle upon rotation of said worm gear.

6. The drive unit as defined in claim 5, said drive element being formed with a recess, said worm being positioned in said recess.

* * * * *